No. 858,466. PATENTED JULY 2, 1907.
J. R. PEIRCE.
MARBLE WORKING MACHINE.
APPLICATION FILED MAR. 17, 1906.
4 SHEETS—SHEET 1.
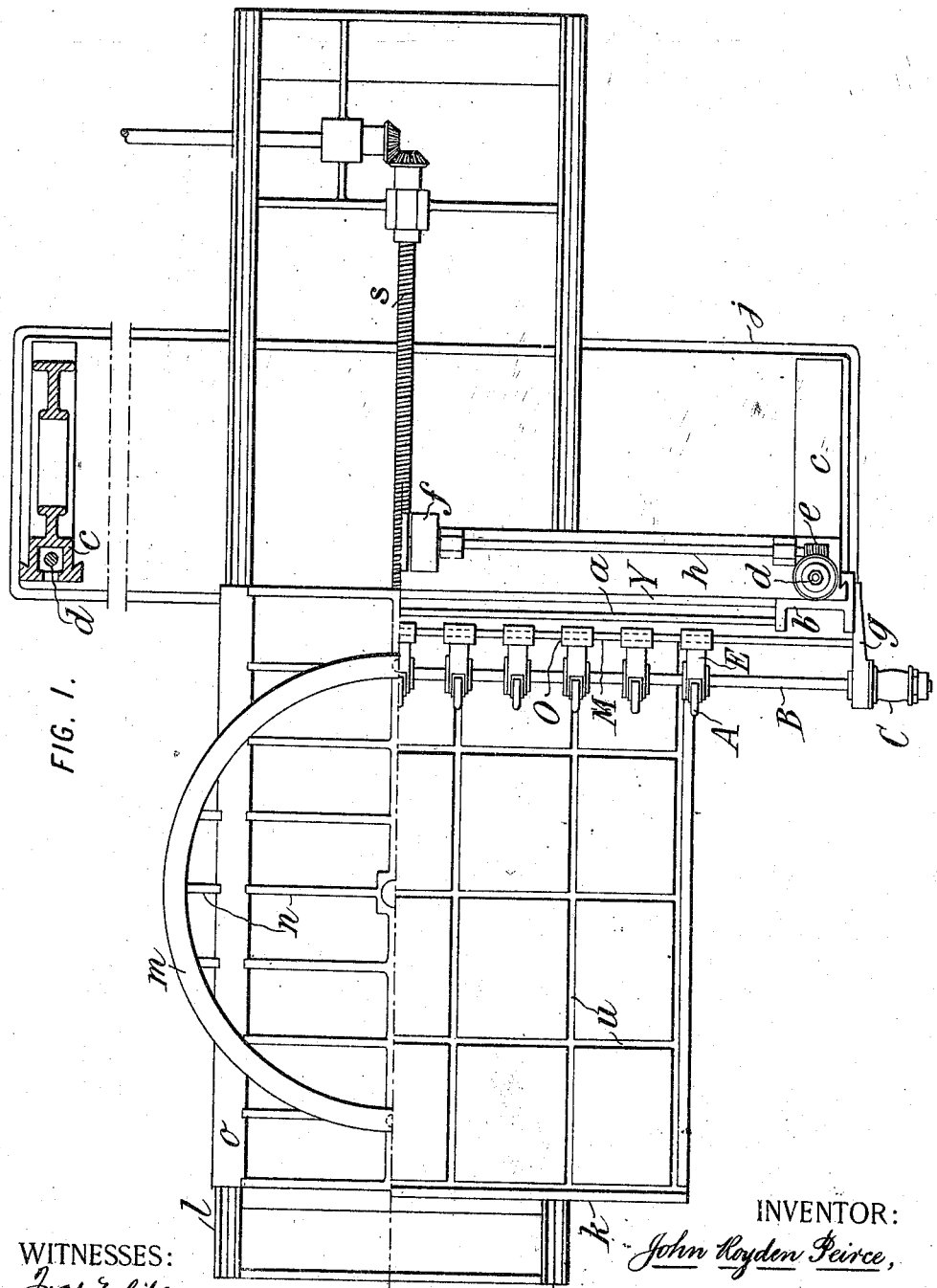
FIG. I.
WITNESSES:
Fred White
Rene' Bruine
INVENTOR:
John Hayden Peirce,
By Attorneys,

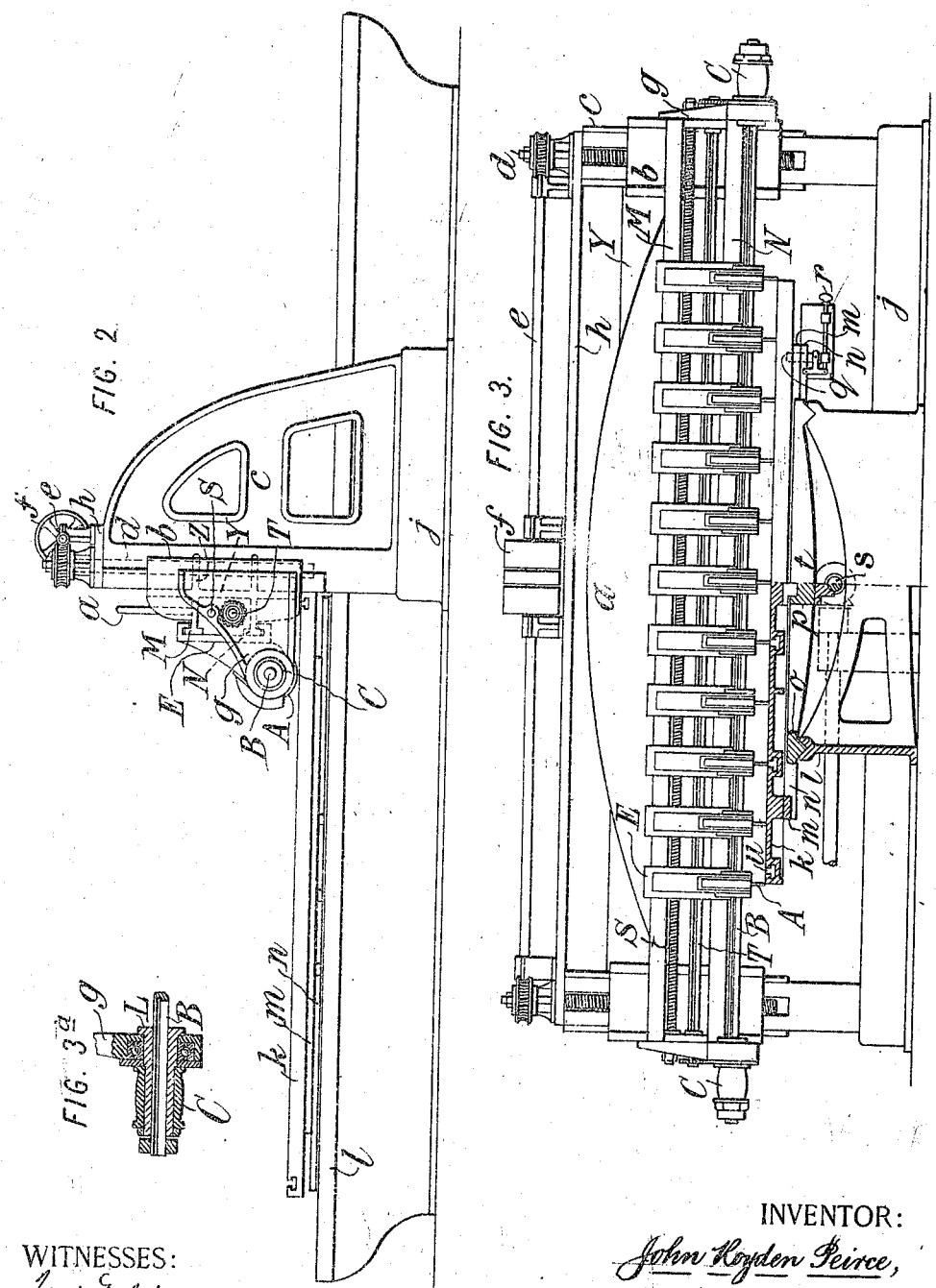

No. 858,466. PATENTED JULY 2, 1907.
J. R. PEIRCE.
MARBLE WORKING MACHINE.
APPLICATION FILED MAR. 17, 1906.
4 SHEETS—SHEET 2.
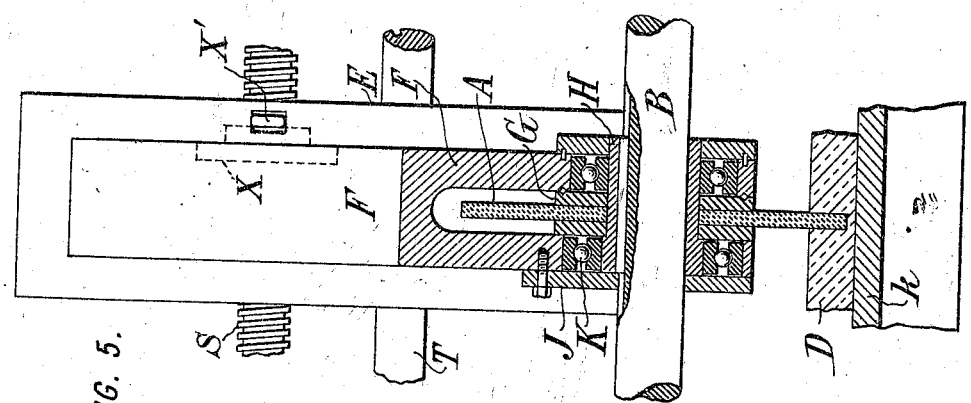
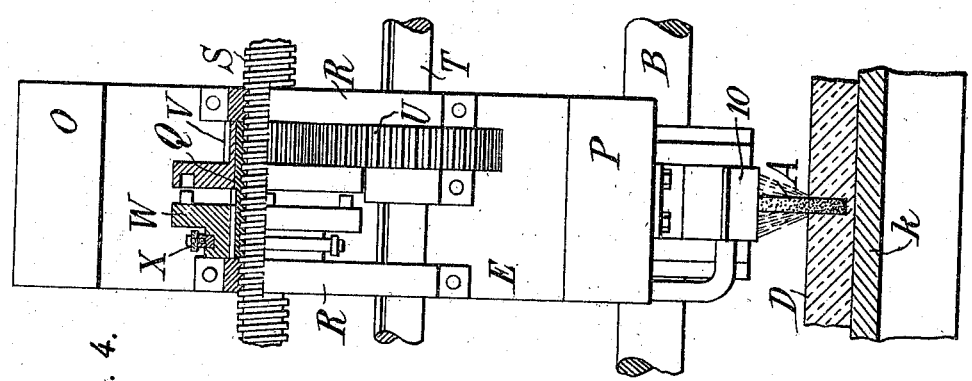
WITNESSES:
INVENTOR:
John Hoyden Peirce,
By Attorneys, No. 858,466. PATENTED JULY 2, 1907.
J. R. PEIRCE.
MARBLE WORKING MACHINE.
APPLICATION FILED MAR. 17, 1906.
4 SHEETS—SHEET 4.
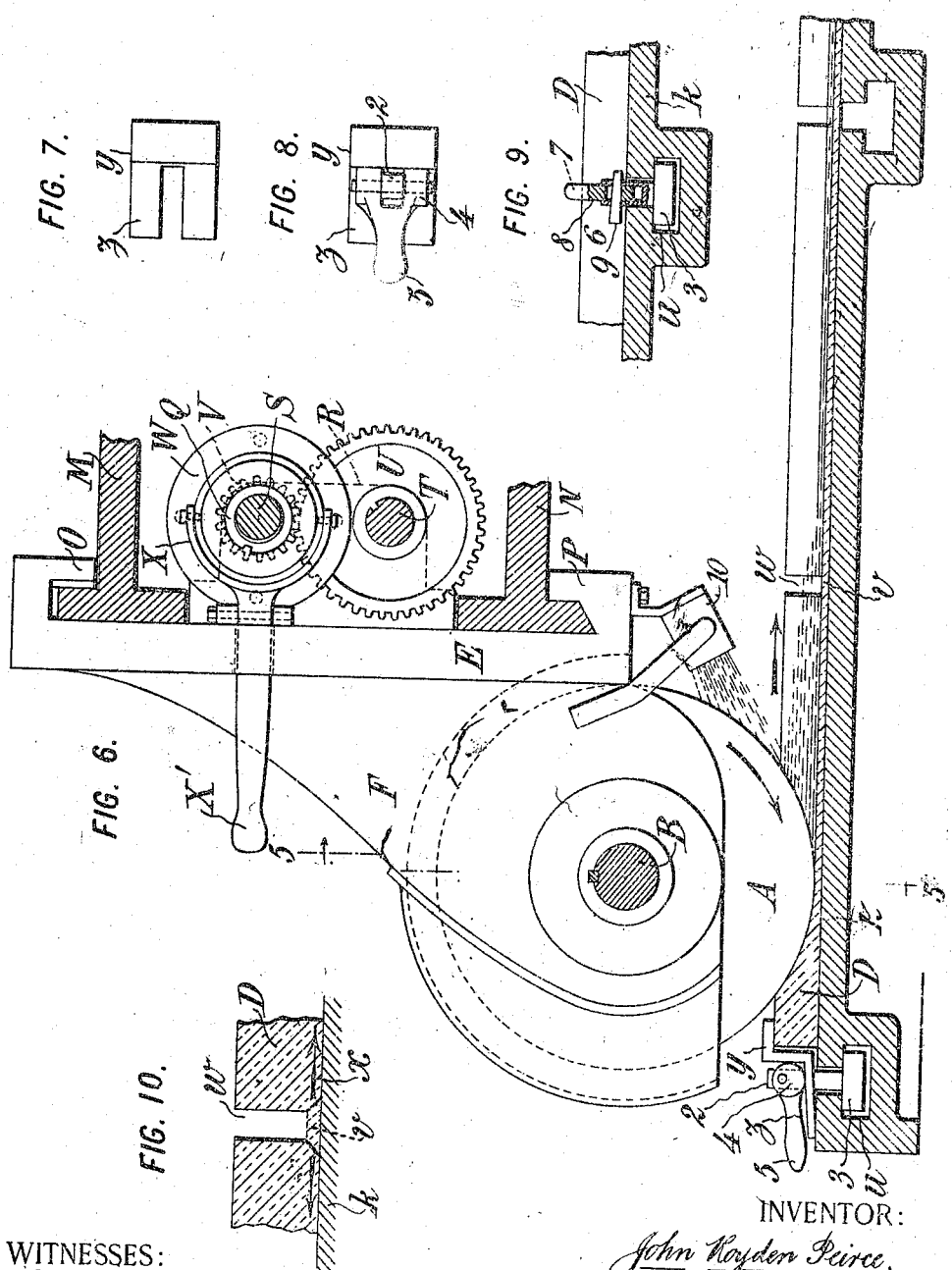
WITNESSES:
INVENTOR:
John Hoyden Peirce,
By Attorneys,

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

MARBLE-WORKING MACHINE.

No. 858,466.      Specification of Letters Patent.      Patented July 2, 1907.

Application filed March 17, 1906. Serial No. 306,558.

*To all whom it may concern:*

Be it known that I, JOHN ROYDEN PEIRCE, a citizen of the United States, residing in the borough of Manhattan, city, county, and State of New York, have invented certain new and useful Improvements in Marble-Working Machines, of which the following is a specification.

This invention aims to provide improvements especially adapted to a gang machine for cutting marble or similar stone by means of a gang of cutters consisting preferably of thin wheels of carborundum or similar agglomerated crystalline or granular material; certain improvements in detail being applicable to various other machines.

The accompanying drawings illustrate a machine embodying the invention.

Figure 1 is a half plan and half horizontal section. Fig. 2 is a side elevation. Fig. 3 is an end elevation showing certain parts in section. Fig. 3ª is an enlarged detail of one of the end bearings shown in Fig. 3. Fig. 4 is a rear elevation, partly in section, of one of the cutters and its connected mechanism. Fig. 5 is a section approximately on the line 5—5 of Fig. 6. Fig. 6 is a side elevation of one of the carriages and the cutter therein. Fig. 7 is a plan of a portion of a clamp. Fig. 8 is a complete plan of the same clamp. Fig. 9 is a vertical view, partly in section, of another style of clamp. Fig. 10 is a sectional view illustrating the manner of operating on the stone.

Referring to the embodiment of the invention illustrated, a number of thin wheels A of carborundum, the mesh or size of which depends upon the nature and conditions of the work, are arranged alongside of each other as shown, and are splined upon a common driving shaft B adapted to be rotated at high speed (say to give a circumferential velocity of a mile a minute for the wheels) by means of belt pulleys C on opposite ends of the shaft. A slab of marble D being fed to the wheels, receives a number of parallel cuts so that it may be divided at one passage through the machine into a number of narrow slabs such as are used for base-boards or the like. The cutters are arranged to be adjusted along the shaft so as to vary their distance from each other and to vary the width of the base-boards or similar products. Means are provided also for varying the position of the slab angularly so that two series of cuts may be made, one crossing the other, as, for example, when it is desired to make marble tiles. By passing the slab twice through the machine, it may be cut up into a number of tiles of any desired dimensions.

Each of the wheels is secured in a carriage, designated as a whole by the letter E. Fig. 5 illustrates the preferred manner of mounting a wheel in the carriage. A forwardly projecting flange F of the carriage is slotted, the slot being wide enough to accommodate the wheel and a pair of central plates G mounted on a hub H which is splined on the shaft B as described, the hub having a flange J which is bolted to the carriage. Ball bearings K are preferably provided.

In order to insert or withdraw a wheel when renewals or repairs are necessary, the shaft B is drawn out endwise, and the desired wheel is removed from its carriage by removing the hub H.

In order to facilitate the withdrawal of the shaft B without interfering with the pulleys C, the latter are carried upon a special hub L, as indicated in Fig. 3ª, which hub is journaled in the frame of the machine and splined on the shaft. Either one of the end nuts on the shaft may thus be removed and the shaft drawn out through the pulleys and any desired number of wheels without interfering with any of the working parts.

In order to adjust the spacing of the wheels, the carriages are arranged to slide upon a pair of guides M N upon the front portion of the frame of the machine, these guides being engaged respectively by overhanging flanges O and P upon the back of each carriage. The movement of each carriage is effected by the rotation of a nut or sleeve Q carried between flanges R (the near flange being removed in Fig. 6) projecting at the back of the carriage and threaded upon a shaft S which is fixed at its opposite ends in the frame of the machine and held against rotation. The rotation is effected by means of a shaft T splined through a gear U carried by each carriage, this gear in turn engaging a pinion V which normally engages a clutch-sleeve W splined on the nut or sleeve Q. The clutch-sleeve W is connected to one end of a clutch-lever X projecting out of the front of the carriage to form a handle X' and operating in the usual way to throw the sleeve W into or out of engagement with the pinion V.

The relation between the gear U and pinion V is different in the several carriages, the ratio increasing from one end to the other of the machine, so that the speed of adjustment shall vary as the adjusting shaft T is rotated, and the several wheels shall preserve equal distances if all the clutches be in engagement. If for any purpose it be desirable to arrange the wheels at other than regular spaces, the clutch of the proper carriage may be thrown out of engagement when the wheel is at the desired point. For example, when any number of the wheels are to be withdrawn entirely from the marble, their carriages will be adjusted until they reach approximately the end of the screw-shaft S, whereupon the clutches will be disconnected and the wheels to be used will then be adjusted to any desired positions. The shafts B, T and S are made to extend considerable distances on both sides of the bed so as to provide ample room for the withdrawal of any number of wheels from service, and also to provide for the turning of the slab, as hereinafter described.

The guides M and N for the wheel carriages are preferably integral parts of a beam Y from which these guides project forwardly, said beam being provided also with rearwardly extending ribs Z, shown in dotted lines, Fig. 2, and with an upwardly projecting arched rib $a$, thus providing a very simple construction of great strength to resist the lateral and vertical pressures. The beam Y is carried at its ends upon slides $b$ which have overhanging guides engaging vertical ribs upon the main side frames $c$ of the machine. The slides $b$ are threaded upon vertical screw-shafts $d$ carrying worm gears at their upper ends and driven by worm shafts $e$, which in turn are driven by pulleys $f$ at the center of the machine. Any arrangement of pulleys may be provided for lifting the ends of the beam Y independently or simultaneously, either for purposes of adjustment or to permit the passage of the stone under the wheels. The shafts B, T and S are preferably mounted upon brackets $g$ arranged on the outside of the slides $b$. The upper ends of the side frames $c$ are tied together by a plate $h_1$ and the lower ends by a base $j$, giving the entire apparatus great rigidity. The upper plate $h$ serves also as a support for the intermediate bearings of the shafts $e$ for raising and lowering the beam.

The stone is carried upon a bed $k$ which is designed to be reciprocated upon longitudinally-arranged ways $l$. Provision is also made for turning the bed $k$ so that after one series of cuts has been made the stone may be turned without unclamping it from the bed, and the second series of cuts made transverse to the first. To secure this adjustment a circular bearing ring $m$ is provided upon an intermediate frame $n$, the latter being provided with bearing edges $o$ which run directly on the longitudinal ways $l$. The bearing ring $m$ lies in a rabbet or groove of the frame $n$, and the bed $k$ is provided with a central pin $p$ engaging the latter. A pin $q$ is carried by the intermediate frame $n$, and is raised or lowered by a handle $r$ projecting to the outside of the bed, suitable sockets being arranged on the under side of the bed to receive the pin and to hold the bed at certain definite angular positions. The intermediate frame $n$ is reciprocated by means of a longitudinal worm shaft $s$ driven by any suitable gearing and engaging a downward projection $t$ at the center of the intermediate frame. The bed $k$ is provided with grooves $u$ or other suitable devices for the attachment of clamping means.

A slab being clamped upon the bed, the shaft $s$ is rotated in the desired direction, and a series of cuts made at the desired spacing. The operator then withdraws the pin $q$ and turns the bed, say 90 degrees, and by a rotation of the shaft $s$ in the opposite direction returns the bed to its starting point, the cutting wheels being lifted to permit the passage of the slab. The bed is then fed again in the original direction, and a series of cuts is made transverse to the original series. Or, the cutting wheels may be made to rotate in an opposite direction and to effect the second series of cuts when the slab is returning to its starting point. In order to retain the slab upon the bed, and the various parts of the slab in proper position, the wheels are adjusted so as to cut nearly but not quite through. The method is indicated best in Figs. 6 and 10. The very thin wall $v$ of marble left at the bottom of the cuts or grooves $w$ connects the parts on opposite sides of the respective grooves, so that when a cut is to be effected in a direction transverse to a groove $w$ the strain, which is in the line of the arrows $x$, is not sufficiently strong to separate the parts on opposite sides of the groove $w$. Thus the slab after being once clamped on the machine may be cut a number of times and in any direction desired without having to reclamp it. When all the desired lines have been cut, the mere lifting of the slab puts a transverse strain on the wall $v$ at the bottom of the grooves, and breaks this off in the manner indicated in Fig. 10. Any portions of the wall $v$ which adhere to one side or the other are readily knocked off. This process leaves the rear edge in a rough condition, which is not objectionable in most of the classes of work which this machine is designed to turn out, since the slabs made by the machine are usually disposed only upon one face, and it is desirable in setting the marble that the rear line of each edge should be beveled off. Of course where a perfectly smooth edge of the slab is desired, the wheel must be arranged to cut entirely through the slab, and for this purpose the slab will be bedded on a thin layer of plaster of paris or similar material.

In order to facilitate the movement of the slab backward and forward under the wheels in various positions, I have invented a clamping device which does not project substantially above the top of the slab when in the fastened position. One form of the device is shown in Figs. 6, 7 and 8, and another in Fig. 9. The clamp is not herein claimed as a separate invention, being so claimed in my application No. 339,358, filed October 17, 1906.

Referring to the first form, a clip $y$ is provided having a portion overhanging the edge of the marble and projecting above the face of the marble only by the thickness of the sheet-metal usually employed. The clip $y$ has a base portion $z$ adapted to rest approximately on the bed $k$ of the machine when the upper part of the clip engages the marble. The base $z$ of the clip is forked, and there projects upward through the fork a fastening device comprising a pin 2 having a head 3 engaged within the groove $u$ and carrying pivoted thereon a pair of eccentrics 4, one on each side of the pin 2, the eccentrics being provided with a handle 5. The position of the eccentrics is such that when they are in the fastening position, pressing down upon the base $z$ of the clip, the handle 5 is in its downward position. Preferably the eccentric swings a little past its center in the fastening position, so as to be locked there. It will be seen from an inspection of Fig. 6 that the entire clamp does not project above the top of the clip. In order to release the clamp the handle 5 is thrown upward. Clips of different heights are provided for different thicknesses of stone, but as there are only a few standard thicknesses to be considered this is not a difficult matter. The pins 2 with the eccentrics mounted thereon are always of the same length, the only variation necessary being in the clips. Not only is the construction exceedingly simple and cheap, but the operation is very quick and the stone is very firmly clamped.

Another clamp which projects above the slab only by the thickness of the metal overlying the edge of the slab, is shown in Fig. 9, in which a hollow pin 6 carries a head 3 engaging in the groove $u$ as usual, and a clip 7 has a vertical leg 8 entering the pin 6; the leg 8 being forced down into the hollow pin 6 a distance corresponding to the thickness of the marble slab by means of a wedge 9 passing through registering slots in the pin 6 and leg 8 respectively. This clamp has the advantage of being adjustable for a considerable variation in the thickness of the slabs, though not so convenient to operate, the wedge 9 having to be driven in or out by means of a hammer of the like.

A rose or nozzle 10 is provided adjacent to each of the wheels, and supported on the same bracket so as to travel therewith and to direct a copious supply of water to the cutting point, any suitable flexible connection to the source of supply being provided. Any other means for providing the desired quantity of water may be applied.

The process of cutting a number of lines nearly through, leaving only sufficient web to hold the parts together, and then removing the slab from the bed and separating all the parts, is not claimed in the present application, being claimed in my application No. 307,685 filed March 23, 1906.

Though I have described with great particularity of detail certain specific embodiments of the invention, yet it is not to be understood therefrom that the invention is limited to the particular embodiments described. Various modifications in detail and in the arrangement and combination of the parts may be made by those skilled in the art without departure from the invention.

What I claim is:—

1. A machine for coping marble, comprising a number of thin wheels A of carborundum arranged alongside of each other and adapted to cut in either direction, a separate carriage E for each of said wheels, a common shaft B by which all of said wheels are rotated, means for rotating said shaft at a high speed, and means for feeding a slab thereto in each of two opposite directions to make a plurality of cuts simultaneously in either direction.

2. A machine for coping marble, comprising a number of thin wheels of carborundum arranged alongside of each other, means for rotating said wheels at a high speed, means for feeding a slab of marble thereto to make a plurality of cuts simultaneously, and a single means for simultaneously adjusting all said wheels to vary the distance thereof from each other.

3. A machine for coping marble, comprising a number of thin wheels of carborundum arranged alongside of each other, means for rotating said wheels at a high speed, means for feeding a slab of marble thereto to make a plurality of cuts simultaneously, a single means for simultaneously adjusting all said wheels to vary the distance thereof from each other, and means for disconnecting individual wheels from said adjusting means.

4. A machine for coping marble, comprising a number of thin wheels A of carborundum arranged alongside of each other and adapted to cut in either direction, a separate carriage E for each of said wheels, a common shaft B by which all of said wheels are rotated, means for rotating said shaft at a high speed, means for feeding a slab of marble thereto in each of two opposite directions to make a plurality of cuts simultaneously in either direction, and means for adjusting the position of the slab angularly so as to make two series of cuts, one series on the forward movement of the slab, and another series crossing the first on the return movement dividing the slab into a number of pieces having four finished edges.

5. A machine for coping marble, comprising a number of thin wheels A of carborundum arranged alongside of each other, a separate carriage E for each of said wheels, a common shaft B by which all said wheels are rotated, means for rotating said shaft at a high rate of speed, and a bed for carrying a slab of marble and feeding the same to said wheels to make a plurality of cuts simultaneously.

6. A machine for coping marble, comprising a number of cutters, a common shaft upon which all said cutters are splined, means for operating said shaft at a high rate of speed, means for feeding a slab of marble to said cutters to make a plurality of cuts simultaneously, a threaded shaft S fixed against longitudinal movement, a series of nuts or internally-threaded sleeves Q connected to the several cutters, and means for simultaneously rotating the several nuts Q at varying rates of speed so as to adjust the spacing between the several cutters simultaneously and at the same time to maintain the spacing uniform.

7. A machine for coping marble, comprising a number of cutters, a common shaft upon which all said cutters are splined, means for operating said shaft at a high rate of speed, means for feeding a slab of marble to said cutters to make a plurality of cuts simultaneously, a threaded shaft S fixed against longitudinal movement, a series of nuts or internally-threaded sleeves Q connected to the several cutters, means for simultaneously rotating the several nuts Q at varying rates of speed so as to adjust the spacing between the several cutters simultaneously and at the same time to maintain the spacing uniform, and a clutch through which each of the nuts Q is operated, whereby any one of the cutters may be unmoved while the others are being adjusted.

8. A machine for coping marble, comprising a number of thin wheels A of carborundum, a carriage E for each of said wheels and having a slot in which the wheel lies, a hub for said wheel normally fastened in the carriage but removable therefrom, and a shaft B upon which the several hubs are splined so that the shaft may be withdrawn endwise through a number of the wheels and one or more of the wheels removed without removing the others.

9. A machine for coping marble, comprising a number of thin wheels A of carborundum, a carriage E for each of said wheels and having a slot in which the wheels lies, a hub for said wheel normally fastened in the carriage but removable therefrom, a shaft B upon which the several hubs are splined so that the shaft may be withdrawn endwise through a number of the wheels and one or more of the wheels removed without removing the others, and a pulley C supported upon the frame of the machine and splined upon said shaft for driving the same and for permitting the endwise withdrawal of the shaft without removal of the pulley.

10. In combination, a bed upon which a slab of marble is adapted to be clamped, a cutter carried above said bed on a horizontal shaft, a clip engaging the edge of the slab, and a fastening device lying substantially below the level of the top of the clip so as to be out of the way of the horizontal shaft and adjacent parts.

In witness whereof, I have hereunto signed my name in the presence of two subscribing witnesses.

JOHN ROYDEN PEIRCE.

Witnesses:
D. ANTHONY USINA,
FRED WHITE.